No. 640,983. Patented Jan. 9, 1900.
F. O. WOODLAND.
AUTOMATIC FEEDER MECHANISM FOR BOTTLE STOPPERING MACHINES.
(Application filed Apr. 3, 1899.)
(No Model.) 3 Sheets—Sheet 2.
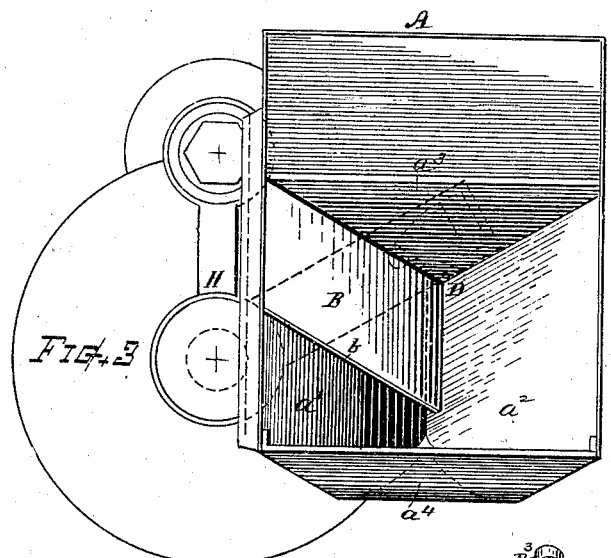
FIG. 3.
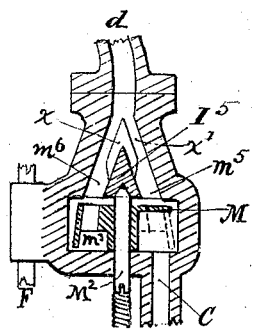
FIG. 12.
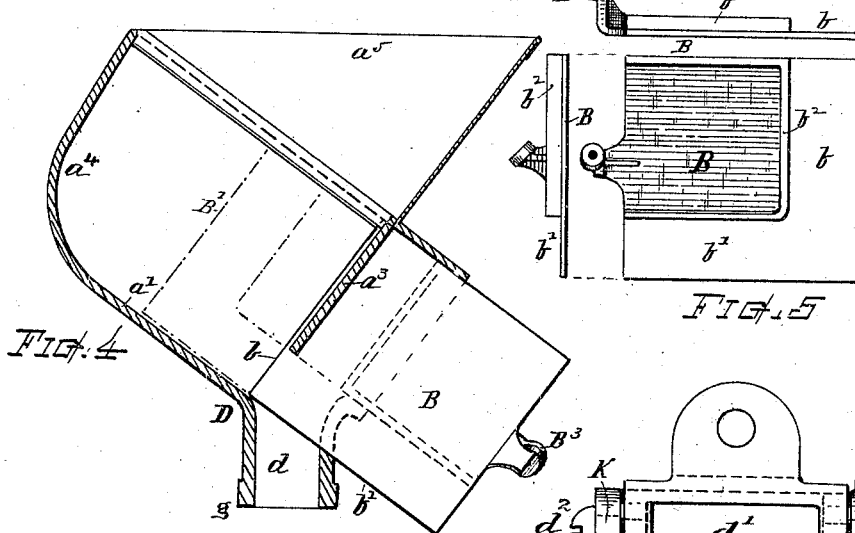
FIG. 4.
FIG. 5.
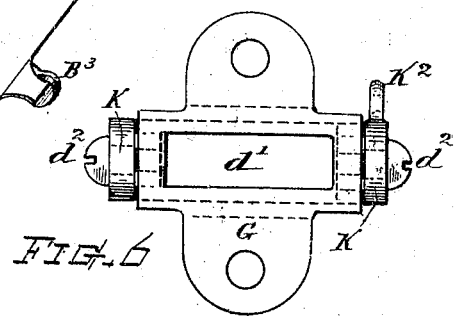
FIG. 6.
Witnesses
W. E. Buck
Charles L. Bacon
Inventor.
Frank O. Woodland
By Chas. H. Burleigh
Attorney

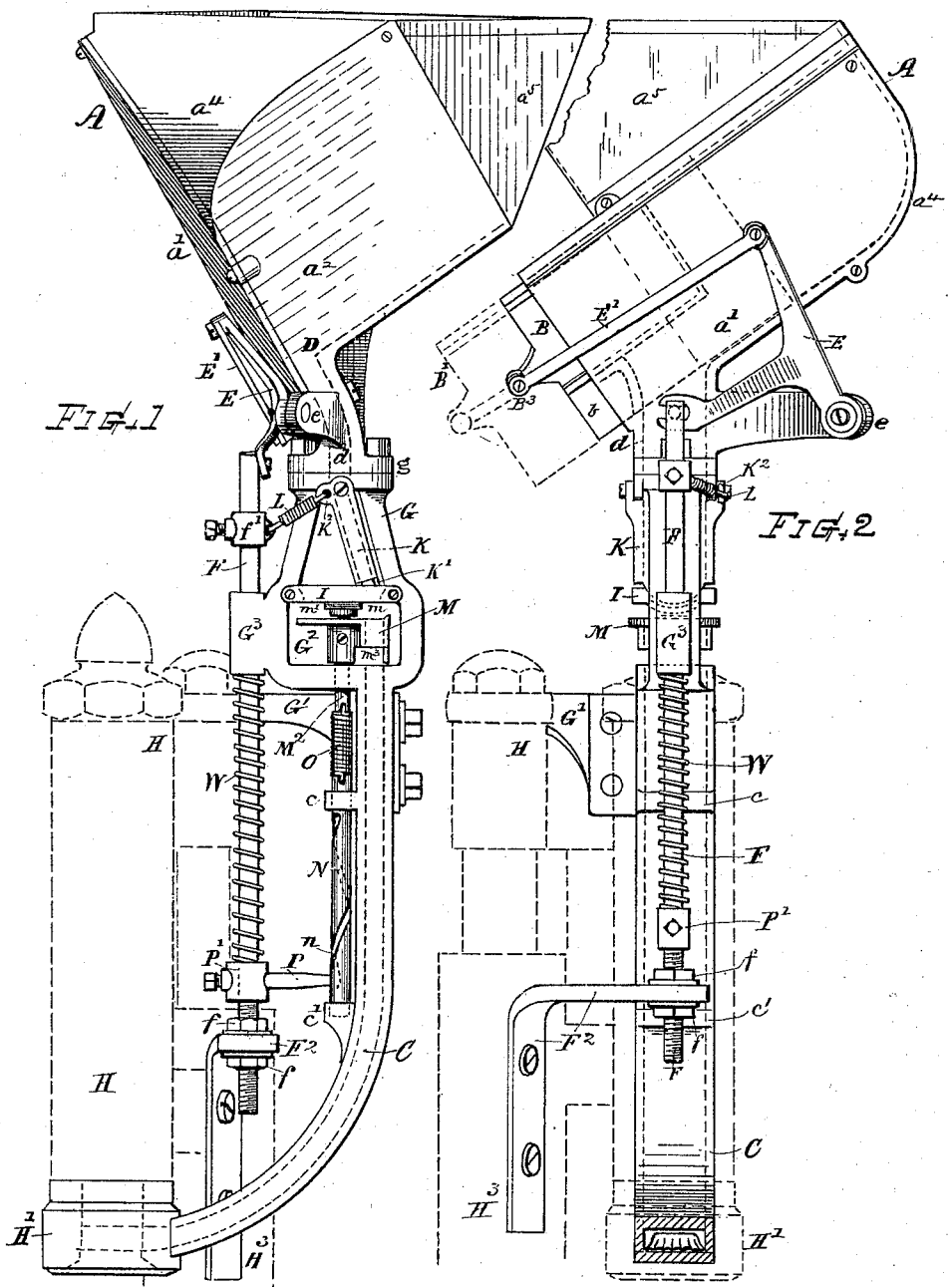

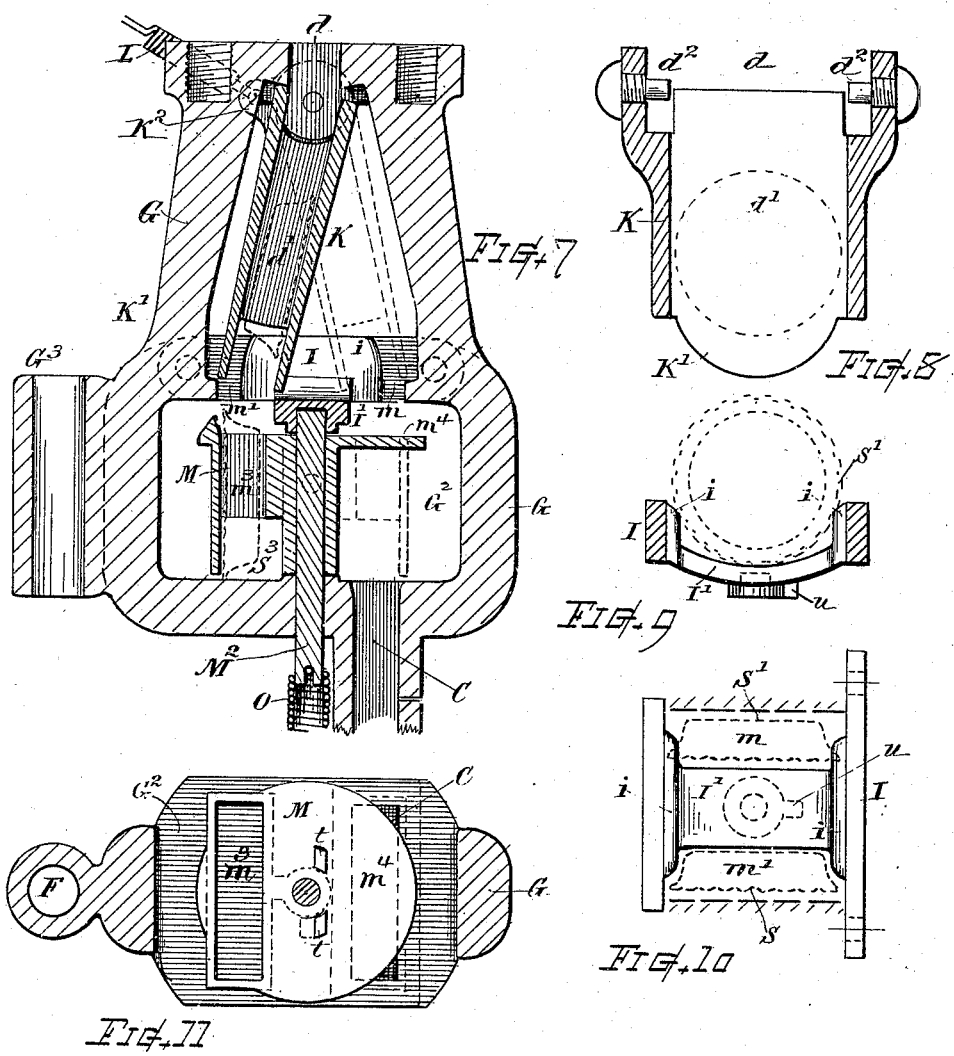

UNITED STATES PATENT OFFICE.

FRANK O. WOODLAND, OF WORCESTER, MASSACHUSETTS.

AUTOMATIC FEEDER MECHANISM FOR BOTTLE-STOPPERING MACHINES.

SPECIFICATION forming part of Letters Patent No. 640,983, dated January 9, 1900.

Application filed April 3, 1899. Serial No. 711,500. (No model.)

*To all whom it may concern:*

Be it known that I, FRANK O. WOODLAND, a subject of the King of Sweden and Norway, residing at Worcester, in the county of Worcester and State of Massachusetts, have invented a new and useful Automatic Feeder Mechanism for Bottle-Stoppering Machines, of which the following, together with the accompanying drawings, is a specification sufficiently full, clear, and exact to enable persons skilled in the art to which this invention appertains to make and use the same.

The object of my present invention is to provide an efficient, desirable, and conveniently operative means for automatically assembling and delivering in regular order crown bottle-stoppers to bottle-stoppering machines such as are employed for capping or sealing beer-bottles and other similarly-bottled liquids; also, to provide in a stopper-feeding mechanism for the purpose specified a mechanically-actuated reversing appliance, in connection with the feed-hopper throat, and the delivery conduit, chute, or runway, whereby oppositely-facing stoppers or crowns are transposed to uniform relation and passed to the chute or conduit for delivery in regular predetermined order, as more fully hereinafter explained. I attain these objects by mechanism the nature and operation of which is illustrated in the drawings, wherein—

Figures 1 and 2 represent elevational views of an automatic feed mechanism embodying my invention. Fig. 3 represents a top plan view of the hopper. Fig. 4 is a sectional view showing one side of the inclined bottom of the hopper with the movable shelf therein. Fig. 5 shows the bottom side of the inclined bottom of the hopper with the movable shelf therein. Fig. 5ª shows the bottom, side, and edge views of the movable shelf-plate separate from other parts. Fig. 6 is a plan view, on a larger scale, of the conductor-frame where it joins the throatway of the hopper. Fig. 7 represents a vertical section through the conductor-frame and the separating and reversing devices. Fig. 8 shows a separate longitudinal section of the vibrating guide. Fig. 9 is a section, and Fig. 10 a plan view, of the separator device. Fig. 11 represents a horizontal section of the head-frame and plan view of the reversing device, and Fig. 12 is a vertical sectional view showing the reverser combined with a stationary separator device.

My invention in feeder mechanism is more especially intended for application in practice in connection with that kind of bottle-stoppering machines used for affixing to bottles that class of bottle-stoppers known as "crowns," "crown-stoppers" or "caps," and which machines comprise an operating-head containing suitable dies or means for clenching the metal crowns or caps upon the heads of the bottles and also provided with a collar or "nut" having a center opening within which the stoppers or crowns are delivered in predetermined order by the feeder mechanism and there held in position to be taken up by the top of the bottle as its neck enters the collar or nut and is carried to the clenching-dies by the capping-on movement of the stopper-affixing mechanism, the operation of this bottle-stoppering mechanism in the clenching on of the cap, crown, or stopper being performed as usual and well known.

The term "crown" or "crowns" is used in this specification as meaning bottle-stopping crowns, caps, seals, or other devices similar in form and nature and for the feeding of which the described combination of mechanism is applicable.

My invention comprises a peculiarly constructed and disposed hopper or receptacle A for receiving the supply of bottle stoppers or crowns promiscuously deposited therein. The bottom of said hopper is shaped angular or as representing a rectangular prismatic box disposed cornerwise to the horizontal plane, so that the several bottom planes $a'$, $a^2$, and $a^3$ are each oblique or inclined downward to a common point of delivery or lower corner D, so that a horizontal section of the bottom of the hopper would present three downwardly-converging surfaces and three angles terminating in the exit-throatway $d$, which exit passage or throatway leads out from the meeting angles, as indicated, the side plane of the throatway merging from the plane of the bottom surface $a'$, said throatway curving downward to a vertical position, substantially as shown. Overlying one of the inclined bottom surfaces $a'$ I provide a movable shelf-plate B, adapted to slide into and from the hopper-chamber, as indicated by full lines and dotted lines B' in Figs. 2 and 4. Said shelf-plate is formed, substantially as shown in Figs. 4 and 5, with an overhanging shelf or margins $b\ b'$ along its inner and lower edges, said margins being somewhat wider than the width of a crown bottle-stopper, while the depth of the body $b^2$ of the shelf-plate or space beneath the marginal portions approximately corresponds to the thickness or height of a crown-stopper plus a slight dimension sufficient for clearance, so that the crowns can freely slide in single order beneath the shelf or marginal portions $b$ and $b'$ of the plate B, said margins occupying two sides of a square, and the space beneath said shelf-margins runs into the throatway $d$ in such manner that any crowns coming beneath the shelf can readily slide down into and through the throatway whether said crowns are top side or bottom side up—that is, with their open faces toward the shelf or toward the bottom plate $a'$ in the hopper.

The shelf-plate is adapted to move in and out along the inclined bottom of the hopper, and for operating it an angle-lever E is fulcrumed on a projecting arm or stationary support at $e$ and actuated by a pin or connection from the vertical rod F, the arm of said lever being joined to the outer end of the shelf-plate by a connection E' and pivoted to a suitable ear $B^3$, as shown in Fig. 2.

The front end of the hopper is preferably formed with an upward-rounded portion transverse to the inclined bottom surfaces, as shown at $a^4$, and the contour of the hopper is brought to a uniform top level by vertical side plates $a^5$, as indicated. This hopper is supported upon the upright conductor-frame G, to which it is connected at $g$, and said frame is in turn supported in connection with the upwardly and downwardly movable head H of the bottle-stoppering machine by a suitable attaching-bracket, as G'. The position of the head of the stoppering-machine is indicated on Figs. 1 and 2 by dotted lines. Such head and the means employed therein for clenching the crowns upon bottles being well known, the operative relation of my improved feed mechanism in combination therewith will be understood without a more detailed description of the stopper-attaching mechanism.

C indicates a conducting chute or runway at the lower part of the frame G and leading into the nut H' of the stopper-attaching head or to any desired place of delivery for the stoppers or crowns, which run down the chute by gravity.

The frame G between the chute and hopper-throat is formed with an open center, wherein I provide means for separating and mechanically reversing such of the crowns as are not primarily in proper positions for passing the chute, thereby causing the oppositely-facing crowns that come from the hopper to be entered to the chute all facing in such direction as to be right side up at the point of delivery. This reversing mechanism is preferably arranged substantially as follows:

K indicates a vibrator or swinging guide pivoted, as at $d^2$, in line with the throatway $d$ to swing back and forth and having a passage $d'$ therethrough in continuation of said throatway. The side faces at the lower end of the vibrator project downward to form semicircular lips, as at K', and between which the crowns are maintained in edgewise upright position while the guide is swung back or forth. At its upper part said vibrator-guide is provided with a side lug or lateral ears $K^2$, projecting from the edge of the guide in or adjacent to the transverse plane of its pivotal axis and is there joined for operation with the rod F by a yielding connecting-link or coiled spring L, one end of which is suitably connected to the projecting ear $K^2$ on said guide, while its other end is suitably connected to the rod F or attached to a collar $f'$ or fastening means on said rod. This spring-link is strained for exerting a slight continuous pulling tension, and the parts are relatively so disposed that the point of its attachment to the rod F will work alternately above and below the level of the guide-pivots $d^2$, thus exerting an upward or downward pull, whereby a pendulous or oscillative action is imparted to the vibrator K by the reciprocative movement of the frame G in relation to the rod F when the machine is in operation.

I indicates a separator which, in conjunction with the vibrator, separates the oppositely-facing crowns and presents them at two points, according to their position of facing—one for passing direct to the chute C and the other into the reverser. The separator preferably comprises two side bars connected centrally by a downwardly-curved transverse bridge I', disposed at such position as will properly clear the lower end or lips of the vibrator. Said separator is formed and fitted into the frame in a manner to afford two passways $m\ m'$, (see Figs. 7, 9, and 10,) and its opposite sides are provided with ledges $i$, the distance between the opposite ledges being less than the diameter of the crown across its flanged edge, but greater than the diameter of its top. Said ledges terminate at about the center width of the passways $m$ and $m'$, so that a crown when facing outward can pass through without interruption, (see dotted line S, Fig. 10,) but when facing inward is arrested by the ledges (see dotted lines S', Figs. 7, 9, and 10) and retained until carried by the vibrator across the bridge I' to the opposite passway, through which it can drop as its flange runs off the ends of the ledges $i$. The separator is secured at stationary position in the frame by screws through the side bar or in other suitable manner.

M indicates the reversing device, consisting of a head or tablet mounted on a vertical spindle or axial shaft $M^2$ within a suitable opening or chamber $G^2$ in the frame G, centrally beneath the passways $m\ m'$, and the reversing device is provided with a space or compartment $m^3$, that can by semirotation of the reverser swing into alinement with the passway $m$ and chute C or with the passway $m'$. The chute or runway C is located at a position offset from the axis $M^2$ of the reverser and separator and approximately beneath or in alinement with the passway $m$. The frame beneath the reverser is substantially flat and at such level that it will support a crown when dropped in the compartment $m^3$, as shown in Fig. 7.

The shaft $M^2$ is journaled in the frame G beneath the reverser-head and also, in the present instance, in a bearing at the center of the bridge I'. Its lower end, which projects through the frame, is coupled to an operating-shaft N by a torsional-spring coupling or helical coil O. The coil O is best detachably connected with the ends of the shaft N and reverser-spindle by inserting a transverse bend of its wire into a notch cut across the end of the shaft and spindle, the expansive action of the spring being sufficient to keep it in connection and its yield permitting its ready removal when desired.

The shaft N is supported to turn in bearings $c$ $c'$ on the chute-frame and is actuated for oscillative rotation by an arm or finger P, attached to the rod F and engaging with a helical groove or thread $n$, formed on the shaft, whereby reciprocative movement in relation to the rod F imparts rotative or semirotative movement to the shaft N, spindle $M^2$, and reverser M, while the torsional coupling O provides for any variation or surplus of movement in the shaft N beyond the limit of motion required for the reverser M, which is limited to a half-revolution right and left by suitable stops, said stops in the present instance being lugs $t$, fixed on the head to contact with a lug $u$, fixed on the bridge I'.

The rod F is connected by the nuts $f$ and arm $F^2$ to the stationary part H of the bottle-stoppering machine, and the downward and upward movement of the head H in the act of affixing a stopper to a bottle effects a relative reciprocal movement between the feeding apparatus and rod F, which moves the shelf-plate B into and from the hopper, swings the vibrator back and forth, and rotates the reverser, so that its compartment $m^3$ comes alternately into line with each of the passways $m$ and $m'$, the normal position of rest for the vibrator and reverser being that with its compartment in line with the chute C, as in Fig. 1.

Upon the rod F, between the bearing $G^3$, through which said rod slides, and the hub P' of the finger P, which is rigidly secured to the rod, I arrange a coiled spring W, acting by its expansive force to lift or partially lift the weight of the feeding mechanism, thereby relieving the bottle-stoppering mechanism from the downward pressure of the feed appliances.

In the operation the stoppers or crowns are dumped into the hopper in a mass and naturally settle down the inclined bottom of said hopper to the exit. Such crowns as lie flatwise on the plate $a'$ can pass under the marginal edge of the shelf B and freely slide out through the throatway $d$ into the vibrator N and if facing to the right drop directly through the reverser into the chute C. If facing toward the left, the crown is arrested on the ledges $i$, where it is held until the vibrator and reverser swing to the left. Then such crown drops into the compartment $m^3$ of the reverser and rests at its bottom edge on the bed or frame. (See dotted lines $S^3$, Fig. 7.) Then as the reverser rotates back to its former position the contained crown is reversed relatively to its position of facement from left to right and drops in proper order into the chute as the reverser completes its half-way rotation. Thus, while the supply of crowns comes from the throatway $d$ without regard to their position of facing, such as are not faced in the required direction are caught in the reverser and presented to the chute in proper position for passing to the collar-nut H' or place of delivery right side up for capping on the bottles. The shelf-plate moving in and out upon the bottom of the hopper serves to stir the mass of crowns or stoppers, and especially it supports the mass of overlying crowns from resting upon or interfering with the movement of such crowns as get beneath the margin or shelf, some of the crowns being taken beneath the said shelf at each reciprocal movement of the shelf-plate, so that a constant and ample feed takes place while the stoppering-machine is in operation.

In some instances a reversing device M substantially such as above described can be employed, in combination with a stationary separator or throatway having non-movable switch devices or grooves, for deflecting the crowns to the right or left as they come from the hopper in oppositely-facing directions. In such instance the reverser M is constructed and operated in the same manner as before specified; but the swing-guide K and separator I are replaced by a divergent or two-way conductor $I^5$, (see Fig. 12,) having ribs $x$ and guide-grooves $x'$ at the sides of the passes and that engage the flanges of the crowns accordingly as they are facing, and thereby direct them into the right or left passes $m^5$ or $m^6$, so that they can pass at the right direct to the chute or at the left into the reverser, to be thereby swung around and then dropped into the chute.

The separator I may in some instances have the bridge omitted from its central part and the side bars joined outside the passways $m$ $m'$. The ledges $i$, which assist the transfer of the crowns, being as shown, such modification permits of the lips of the movable guide being somewhat longer and to embrace the crown at the lower part of its flange.

What I claim as of my invention, and desire to secure by Letters Patent, is—

1. In a feeder for bottle-stoppering machines, the hopper-receptacle constructed as shown and described, with an angular bottom comprising the oblique planes $a'$, $a^2$, and $a^3$ severally disposed in cornerwise position in relation to horizontality, and presenting the downwardly-convergent meeting angles, one of which forms an inclined central V-shaped valley terminating with an exit-throatway leading therefrom at the bottom corner, its side coincident with the plane $a'$, and a movable plate adjacently overlying said plane and having a limiting under space for controlling the passage of stopper-crowns in single order through said exit-throatway, in the manner substantially as set forth.

2. In a feeder for bottle-stoppering machines, a hopper having an angular bottom disposed cornerwise in relation to horizontality, an exit-throatway leading therefrom in continuation of one of the inclined bottom surfaces, and a plate-plunger having a broad overhanging flange movable into and from the hopper-chamber along said inclined bottom surfaces, the space beneath said flange communicating with said throatway, substantially as and for the purpose set forth.

3. The combination of the hopper-receptacle having its bottom surfaces disposed to present three diagonally oblique or inclined surfaces and three convergent meeting angles, a throatway leading from the lower post of the receptacle, one side of said throatway continuous with one of the bottom surfaces, a movable shelf-plate disposed parallel with said bottom surface and having an overhanging margin or shelf and under space approximately corresponding to the width dimension of a crown bottle-stopper, extending along its inner and lower edges and contiguous to said throatway with which said under space unites to a common plane, substantially as and for the purpose set forth.

4. In a feeder mechanism for the purpose specified, the combination with the hopper and the sliding shelf-plate movable into and from the hopper-chamber, of the actuating-rod, the angle-lever fulcrumed on the hopper-supporting frame and engaging said rod, and a connecting-link joining said lever and the projecting end of the shelf-plate, for the purpose set forth.

5. In a feeder for bottle-stoppering machines, the combination, with a hopper having a throatway adapted for delivering crowns in oppositely-faced order; of a pendulous vibrator-guide in continuation of said throatway, and a separator having right and left passways therethrough and side ledges adapted for arresting the wrongly-facing crowns at the end of said vibrator and directing their transfer to the appropriate passway, substantially as set forth.

6. In a feeder for bottle-stoppering machines, the combination, of a hopper having an exit-throatway for the crown-stoppers, means for separating the stoppers or crowns accordingly as they come from the hopper facing in one direction or the other, a chute adapted for conducting regularly-arranged crowns to the place of delivery, an intermediately-disposed pivotal reversing device adapted for arresting the crowns that face in one direction and carrying them around to the opposite position of facing, while permitting direct passage of the properly-faced crowns into said chute; and means for effecting rotative or partially-rotative motion in said reversing device, for the purpose set forth.

7. In a crown-feeder for bottle-stoppering machines, the combination of a hopper having an exit-throatway adapted for passing the crown bottle-stoppers facing in opposite directions, a chute or conduit adapted for delivering the crowns in predetermined uniform order of facing, an intermediately-disposed separating appliance adapted for diverting the oppositely-faced stopper-crowns to two positions, and a horizontally-reversible carrier, said carrier having a compartment that swings into line with said two positions for receiving or passing the presented crowns, and a table or plate portion that obstructs or guards the delivery-passages when the compartment is moved out of line therewith.

8. In a feeder for bottle-stoppering machines, the combination of a hopper, a delivery-throatway therefrom, a vibrating guide beneath said throatway, a separator device adapted for controlling the discharge of the crowns through right or left passways according to their facing position, a delivery-chute and a semirotary reverser adapted for receiving the wrongly-faced crowns and turning them to proper position for entering said chute, and means for operating said vibrating guide and said reverser, substantially as set forth.

9. In a crown-feeder for bottle-stoppering machines, the reversing-head formed with a table-surface, and a through-compartment for containing a crown in edgewise standing position, said reversing-head mounted on an upright axis or spindle within the frame; in combination with the frame provided with a chamber, a delivery-chute leading from said chamber, a guide or passways above said reverser for conducting stoppers thereto, and means for effecting rotative movement of said reversing-head, as set forth.

10. In a feeder for bottle-stoppering machines, the combination of a reversing device, its spindle mounted in the conductor-frame; an operating-shaft connected with said reverser-spindle, an actuator-rod having an arm or finger engaging a helical groove or thread on said shaft, and means for imparting relative reciprocative movement between said conductor-frame and actuator-rod, substantially as set forth.

11. In combination with the chute, the rotative reversing crown-carrier having the axial spindle journaled in the frame, and the actuating-rod, of the spirally-grooved operating-shaft mounted in bearings on the chute-frame, the yieldable spring-coupling uniting said shaft and reverser-spindle, and the finger rigid on said rod and engaging the groove in said shaft, for the purpose set forth.

12. In a feeder for bottle-stoppering machines, a separator device consisting of supporting side bars united by a central transverse bridge having passways at right and left thereof, opposite inwardly-projecting ledges on said side bars terminating in said passways, in combination with a crown-guide adapted to move back and forth above said bridge, for the purpose set forth.

13. In a feeder for bottle-stoppering machines, the combination of the hopper-throat, the pendent vibrating guide provided with a laterally-projecting ear fixed thereon adjacent to its pivot plane, suitable hinging-pivots connecting said guide and hopper-throat, the upright actuating-rod, and a connecting-link spring having one of its ends attached to the ear of said vibrating guide and its other end attached by a collar or suitable means to said rod, and adapted for working alternately above and below the level of the guide-pivot axis, said spring exerting a continued pull tension and imparting pendulous action to said guide, substantially as set forth.

14. The combination with the conductor-frame and delivery-chute, of a crown-reverser, its spindle axially journaled in said frame for partial rotative action, stops for limiting the movement of said reverser, an operating-shaft, a spring or torsional coupling joining said shaft and reverser-spindle, an actuating-rod, means for imparting rotative movement to said shaft from said rod.

15. In a feeder for bottle-stoppering machines, the combination with the conductor-frame, the hopper-throatway and the delivery-chute; of a vibrating or swinging guide, a reversing device axially journaled in said frame for controlling the passage into said chute, stops for limiting the rotative movement of said reverser, an actuating-rod and means for imparting motion to said reverser from said rod, and a yielding connection from said rod to said vibrating guide, whereby the swinging action of the guide and semirotation of the reverser are synchronously effected, for the purpose set forth.

16. In a mechanism for feeding crown bottle-stoppers automatically to bottle-stoppering machines, the combination with an operating-head for capping the stoppers on the bottles, of a conductor-frame adapted for support upon the movable bottle-capping head and having a delivery-chute leading into the nut or collar of said head, a hopper mounted upon said frame and provided with a sliding shelf-plate having a marginal space communicating with the throatway at the bottom of said hopper; a vibrating guide adjacent to the hopper-throat, a separating device with passways for oppositely-faced crowns, a horizontally-oscillative crown-reversing device controlling the chute, an actuator-rod attached to a stationary part of the bottle-stoppering machines, and means for imparting reciprocal motion from said rod to the sliding shelf-plate, the vibrating guide and and the crown-reversing device, for the purpose set forth.

17. In a feeder for bottle-stoppering machines, the combination, of the conductor-frame, the hopper mounted thereon, the sliding shelf-plate at the inclined bottom of said hopper, a swinging lever fulcrumed on the frame end having one of its arms connected by a link-bar with an ear on the outer end of said shelf-plate, the actuating-rod connected with said lever and having a screw-threaded end, and a stationary eye-bracket wherein said rod is adjustably secured by nuts threaded thereon above and below said bracket, as set forth, whereby the relation of said shelf-plate to the hopper-exit can be regulated.

18. In combination with the frame having the hopper, the delivery-chute and operating mechanism supported thereon, said frame provided with the guide-bearing $G^3$, of the actuating-rod arranged through said bearing, and the lifting spring-coil disposed about said rod between said bearing and a foot-support fixed on said rod against which said spring acts by expansive force, substantially as shown and for the purpose set forth.

Witness my hand this 30th day of March, 1899.

FRANK O. WOODLAND.

Witnesses:
CHAS. H. BURLEIGH,
ELLA P. BLENUS.